Patented July 31, 1934

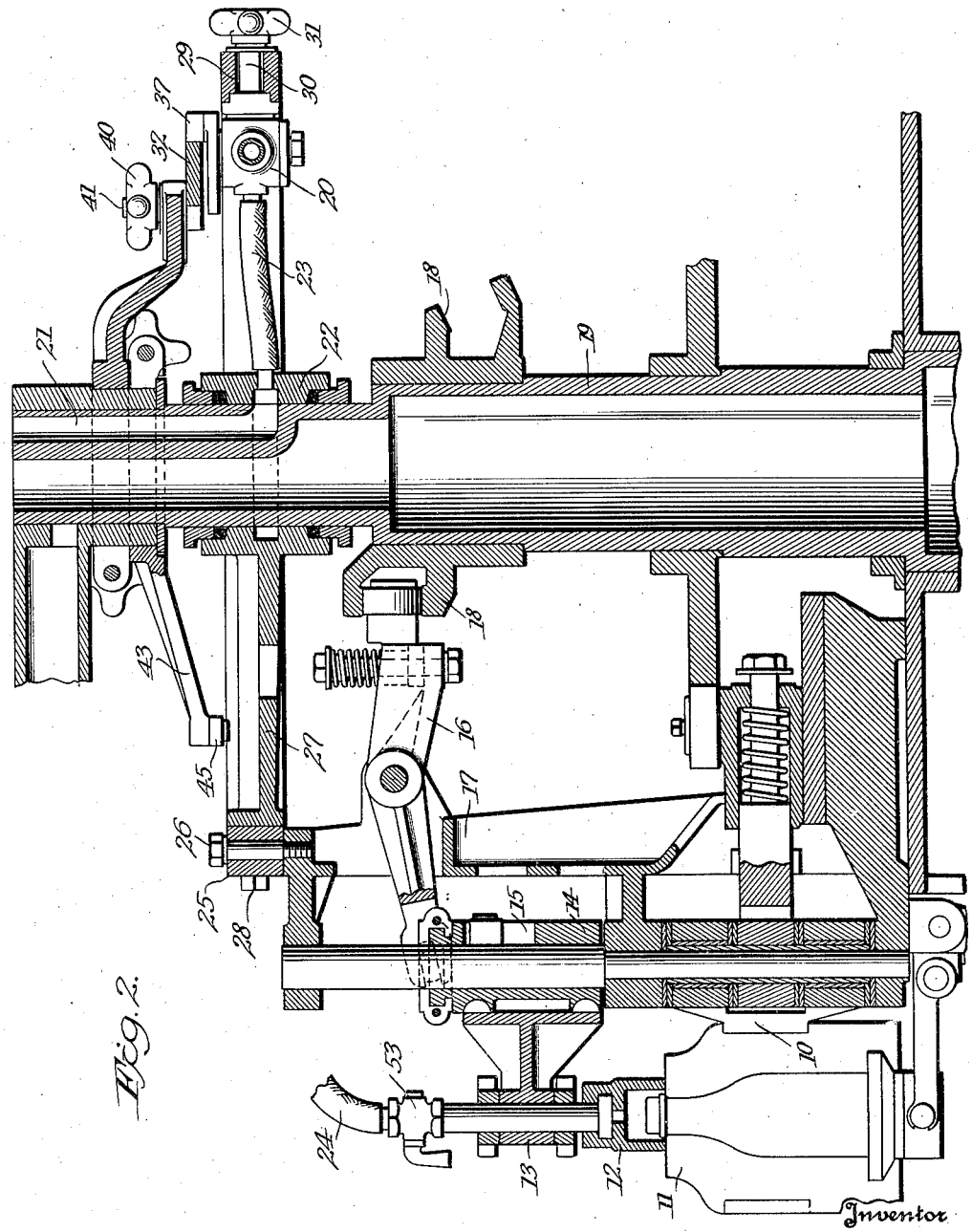

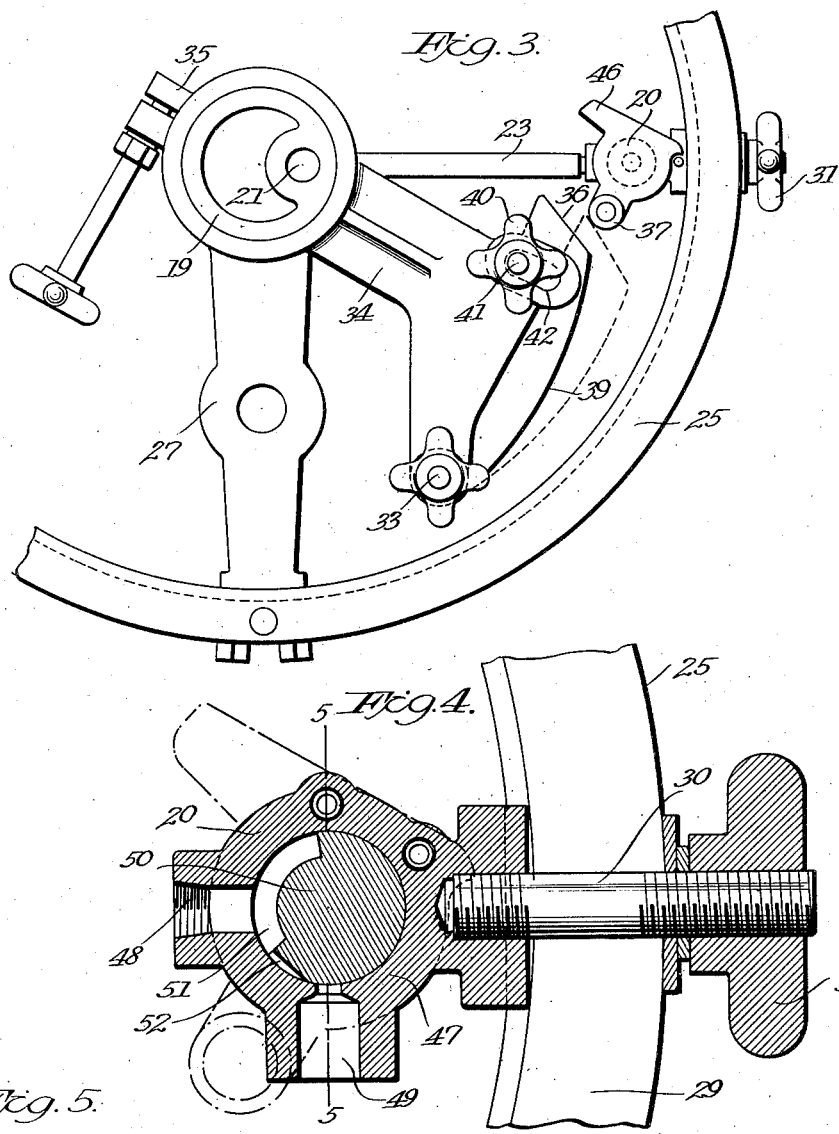

1,968,777

UNITED STATES PATENT OFFICE 1,968,777

BOTTLE BLOWING MACHINE

Edward G. Bridges, Anderson, Ind., assignor to Lynch Corporation, a corporation of Indiana Application August 19, 1929, Serial No. 386,894

25 Claims. (Cl. 49—19)

The present invention relates to automatic bottle blowing machines, and aims generally to improve such machines, particularly the control mechanisms for the blowing devices.

The manufacture of bottles and other glass containers is usually in two stages, the first being the initial shaping of the glass in the parison mold to properly form the parison, and the second, the subsequent blowing of the bottle to its final form or shape in the blow or finishing mold. Present day automatic machines are generally provided with a series of parison molds and a like number of finishing or blow molds, so arranged that the parisons formed in the respective parison molds are blown to final form in the companion or corresponding finishing mold in each set.

Many factors, such as differences in materials, workmanship, and wear, and also variations in the parison molds themselves, make slight differences in the forming operations between the respective molds, thereby producing variations in the parisons formed therein, and requiring adjustments in the final blowing conditions in order to produce uniform ware of high quality.

One of the principal objects of my invention is to overcome the above conditions by the provision of novel control means for the final blowing, permitting of varying the final blowing operation for each mold independently of the others, both as to the starting time, and the volume and pressure of blowing air, thus producing better and more uniform ware.

One embodiment of the invention which will serve as illustrative thereof is shown in the accompanying drawings, wherein Fig. 1 is a plan view of a part of the final blowing mechanism of an automatic bottle blowing machine provided with a control mechanism embodying my invention;

Fig. 2 is a vertical sectional view thereof taken on the line 2—2 of Fig. 1;

Fig. 3 is an enlarged plan view of the control valve and its actuating cam, the latter being shown in its opposite extreme adjusted positions;

Fig. 4 is a detail view of the control valve; and

Fig. 5 is a sectional view thereof taken on the line 5—5 of Fig. 3;

Figure 1:
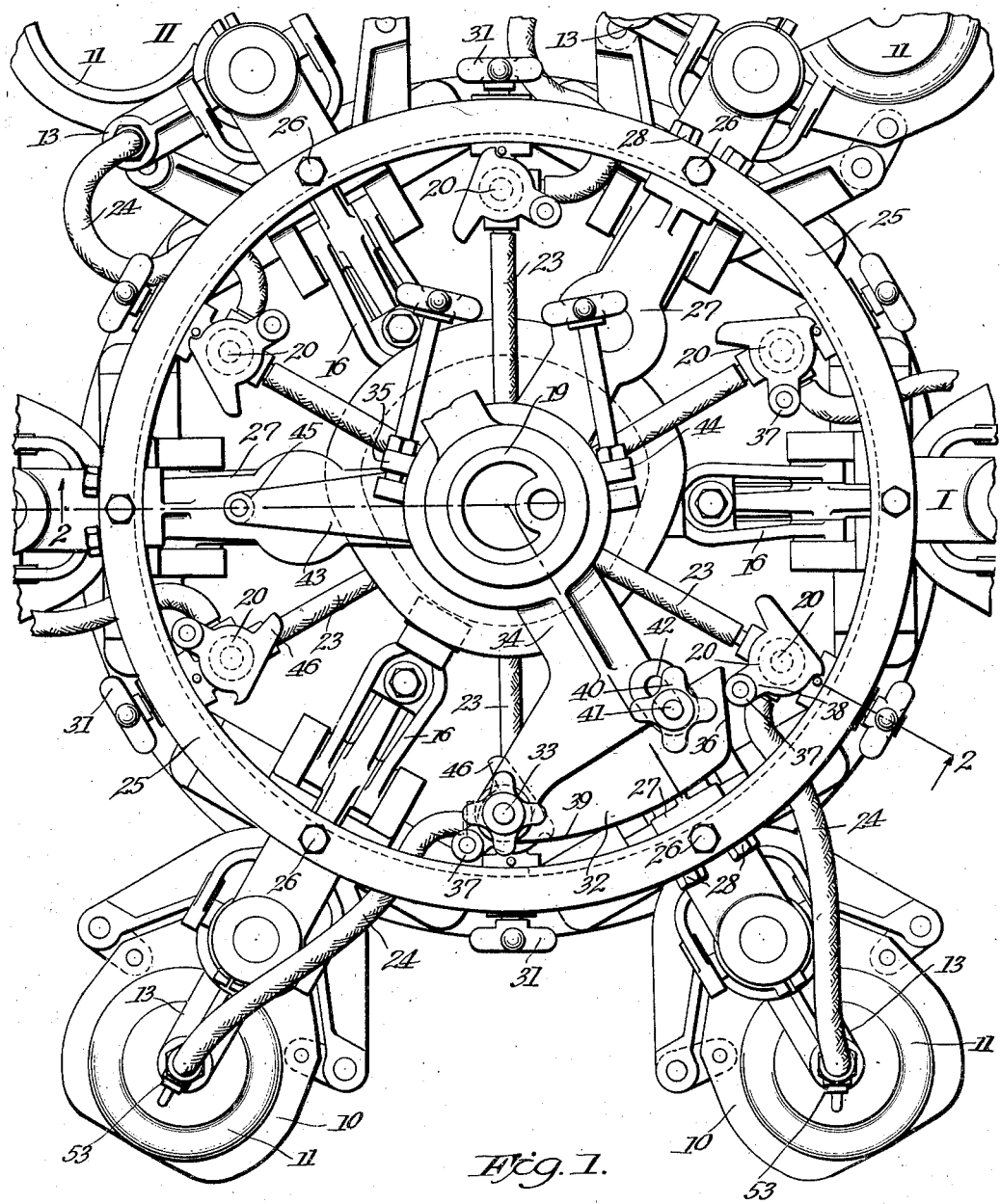

The embodiment of the invention illustrated in the drawings is shown applied to a common form of automatic machine, having blow mold carriers carrying a number of finishing molds adapted to cooperate with parison molds (not shown) mounted upon suitable carriers for conjoint operation.

The blow mold carrier 10 is preferably movably mounted to successively present each of the blow or finishing molds 11 first to the transfer position I, where the molds receive the formed parison, and thence to the taking-out or discharge position II, where the bottle is removed from the machine, the ware in the mold being subjected to air under pressure for a certain portion of its movement from the transfer position I to the discharge position II. For this purpose, suitable blowing means are provided for each mold, which may advantageously comprise a blowhead 12 adjustably mounted upon an arm 13, of a sleeve 14 having a cam slot 15, so shaped that when moved by a lever 16 pivoted to the standard 17 and controlled by a fixed cam 18, on the central column 19, the blowhead will first be swung to a position in alignment with the mold and then lowered into engagement therewith.

Blowing air for the blow head 12 is controlled by suitable valve controlled means, illustrated herein by a series of valves 20, one for each blow head, and preferably of the rocker type, and which are adapted to control the supply of blowing air from a suitable source, as a cored passage 21 in the column 19 by means of a collector ring or hub 22 and flexible conduits 23 from the collector ring to each of the valves 20. Flexible conduits 24 are provided for connecting each of the valves 20 with its blow head, as clearly shown in Fig. 1.

The valves 20 are mounted on a suitable support or frame, which may consist of a rim member 25, mounted at spaced intervals upon the standards 17, by means of suitable fastenings 26, and preferably connected to the collector ring or hub 22 by means of arms 27, fastened to the ring member by screws 28 or other suitable means.

It is desirable to control the commencing of the blowing air for each of the blow heads independently of the others, so as better to suit the particular characteristics of the parison in the corresponding finishing mold, and accordingly the valves 20 are adjustably mounted on the rim 25, and for this purpose the rim 25 may be slotted as at 29, to receive the stems 30 which project laterally from the respective valves 20. Suitable clamping nuts or hand wheels 31 may be threaded upon the stems 30 whereby the valves may be adjusted and clamped to the rim 25 in desired angular position. Obviously, as each valve is moved on the rim 25 toward or from the radial axis of its blowhead and mold, the commencement of the final blowing operation in said mold is advanced or delayed as desired.

Actuation of the valves 20 to admit blowing air from the passage 21 and conduits 23 through the conduits 24 to their respective blowheads 12, may be accomplished by means of a cam 32, pivoted as at 33, to an arm 34, adjustably clamped upon the column 19 by suitable means as, for instance, a hand clamp 35.

The cam 32 is preferably formed with an inclined face 36 adapted to engage rollers 37 on the arms 38 of the stems of the rocker valves 20, and a long face 39 for controlling the rate of opening of these valves; and in order to control the degree of opening and hence the volume and pressure of the blowing air, the cam 32 may be adjustably clamped upon the arm 34 by means of a clamping nut 40 on a stud 41 on the cam 32 and which stud extends through an elongated slot 42 in the arm 34. By reference to Fig. 3 it will be seen that when the cam is clamped in its inward position (as shown in full lines) the roller 37 may ride only upon a short portion of the inclined face 36 of the cam, thus quickly rocking the valve to partially open or crack it, and admitting air of relatively small volume and pressure to start slowly the blowing of the bottle in the finishing mold. As the valve continues its movement past the cam 32, the roller 37 rides along the long face 39 of the cam, which is inclined outwardly from the vertical axis of the column 19, so as to gradually open the valve to full open position, thus progressively increasing the volume and pressure of the air admitted to the blowhead 12. This is particularly desirable in cases where temperature and consistency of the glass in the parison varies, i. e., with hot and cold spots therein, in which case the slow application of air pressure, gradually building up in volume and pressure from a minimum to full strength, permits of the slower expansion of the hotter portions and allows more reheating of the cooler portions, thereby resulting in more uniform expansion of the parison.

Furthermore, present day machines must be adapted to manufacturing various kinds of ware, and in some instances, it is not necessary to gradually increase the volume and pressure of the blowing air, but is desirable to quickly admit blowing air in full volume and pressure to the blowhead. For this purpose, the cam may be adjusted to its outward position (as shown in dotted lines in Fig. 3) wherein the roller 37 will ride upon the full length of the inclined face 36 of the cam, to quickly open the valve to its fully open position when the roller 37 reaches the long cam face 39. As will be apparent, suitable volume and pressure of blowing air may be controlled by intermediate adjustments of the cam between its extreme positions.

As is well understood in the art, the glass parison, when introduced into the finishing mold, consists of a preshaped mass of hot plastic glass, encased by a chilled "skin" or enamel formed by contact of the glass with the walls of the parison mold. Before the bottle may be blown to finished form in the blow mold, to make good quality ware, the parison must be allowed to remain in the finishing mold sufficiently long for the hot glass in the body of the parison to reheat the "skin" and for the parison to attain a uniform temperature throughout or otherwise the surface of the ware will have surface checks and uneven wall thickness. Although the time required for this reheating, or redistribution of heat, approximates the time the glass is chilled in the parison mold, it is variable, depending upon the weight and shape of the parison, and when the skin has reheated to a sufficient temperature for blowing, the glass parison begins to elongate or stretch and it is necessary that the final blowing be accurately controlled to commence at precisely this time. In the illustrated embodiment of the invention, this is accomplished by adjustment of the arm 34 and cam 32 circumferentially around the column 19 by means of the hand clamp 35.

Having adjusted the position of the cam 32, circumferentially of the column 19, to suit the weight and shape of the parison, and also having adjusted the commencement of the blowing time independently for each mold, the duration of blowing time may be adjusted simultaneously for all of the molds. It is desirable to continue the blowing air for as long as possible to facilitate cooling and settling of the bottle in the blow mold, and it is necessary to terminate the blowing air prior to opening the blow molds preparatory to the discharge of the blown bottles from the machine. In the illustrative embodiment, the final blowing operation is terminated by rocking the valve 20 back to its normal closed position, as by means of an arm 43 adjustably clamped to the column 19 by a hand clamp 44, and having a roller 45 lying in the path of the arms 46 on each of the valves 20 to return the latter to normal closed position.

The valves 20 may be of any approved design and construction suitable for the purpose, that shown herein being preferable. As shown, each valve includes a casing 47 having an inlet 48 adapted to receive one end of the supply conduit 23, and an outlet 49 adapted to receive an end of the conduit 24 leading to the blowhead 12. The valve plunger 50 is rockably mounted within the casing 47 and is formed with a cored passage 51 adapted to establish communication between the ports 48 and 49 when the valve is moved to its open position. The end of the passage 51 is chipped out as at 52 adjacent to the inlet port for the passage of air of small volume and pressure when the cam 32 is adjusted to its inward position (as shown in dotted lines in Fig. 3) as explained above.

In some instances it is desirable to make different shapes of bottles or containers on a single machine, which often requires different kinds of blowing, as to volume and pressure, in addition to the commencement and duration of blowing which may be controlled by the adjustment of the valves 20 on the rim 25, as explained above. This may be accomplished in any desirable way, as by means of adjustable cocks 53, in the air line between the valves 20 and the blowhead 12, which may be manually adjusted to regulate the volume and pressure of the blowing air to each blowhead independently of the others. Thus, when the cooling and setting effect of the full pressure blowing air is not specially required, as when making certain grades of ware, which require a comparatively slow blowing of the bottle to its final form, in order to completely and uniformly distribute the glass in the mold, the cocks 53 may be adjusted to regulate the desired volume and pressure admitted to each blowhead 12.

Advantages of my invention reside in the ability to start the approximate blowing time for all blowheads at any place in the arc of movement of the molds from the transfer position to the discharge position after the blowheads are moved into engagement with the molds. This permits accurate starting of the final blowing at the proper time, just as the parison attains its uniform temperature and is ready to stretch and elongate, at which time the glass is most suitable for final blowing. Likewise adjustment of the cam 32 enables me to control the volume and pressure of the blowing air, through a wide range from quick application of air at maximum volume and pressure, to a slow and gradual increase of volume and pressure for the manufacture of more difficult ware. Thus, both the time of commencement and the rate of final blowing may be readily controlled to suit the kind and type of ware being made. The provision of the adjustably mounted individual control valves for each of the blowheads, permits of more accurate control over the blowing operation, and permits of controlling independently the starting of blowing in each mold. The adjustable mounting of the stop lever 43 for returning the valve to its closed or off position, is extremely advantageous in that it permits accurate adjustment of the cutting off of the blowing air, thus permitting of a maximum blowing time with respect to the opening of the molds, and promoting the cooling and setting of the bottle in the blow mold.

My invention obviously is applicable to various kinds of glass blowing machines, other than those for making hollow glass containers, and is not in any way restricted to the details of the machine shown herein. The invention is intended for use particularly in bottle forming machines, both of the "suction" type and the "gob fed" type, and works equally well whether the mold carriers are continuously or intermittently movable.

I claim:

1. Blowing mechanism for glassware forming machines comprising a movable mold, and a blowhead adapted to cooperate therewith for admitting air under pressure to said mold during movement thereof to blow the glass therein to predetermined form, means to move said blowhead into and out of engagement with said mold, and a valve adjustable during movement of the machine for controlling and varying the commencing of the admission of air pressure into the mold from said blowhead independently of the time of application of said blowhead to said mold.

2. Blowing mechanism for glassware forming machines comprising a movable mold carriage, forming molds thereon, means including a blowhead for admitting air under pressure to the respective molds for blowing the glass therein to predetermined form, means to move said blowhead into and out of engagement with said mold, valve means for controlling the admission of pressure to said air admitting means, means for adjusting the position of said valve means laterally with respect to said air admitting means, and means for actuating said valve means to open position, said actuating means being adjustable during operation of the machine to variably control the commencement of the blowing operation according to the weight and shape of the glass in the mold.

3. Blowing mechanism for glassware forming machines comprising a movable mold carriage, forming molds thereon, means for admitting blowing air under pressure to the respective molds for blowing the glass therein to predetermined form, an adjustable valve for controlling the admission of blowing air to said mold after engagement by said air admitting means, and means for actuating said valve to open position, said actuating means being adjustable during operation of the machine to variably control the commencement of the blowing operation according to the weight and shape of the glass in the mold.

4. Blowing mechanism for glassware forming machines comprising a movable mold carriage, a series of forming molds thereon, means for admitting air under pressure to the molds for blowing the glass therein to predetermined form, a valve individual to each mold laterally adjustable with respect to said air admitting means and movable with the mold for controlling the admission of pressure to said air admitting means, and means for actuating said valve to open position, said actuating means being adjustably fixed in the path of the valve means to variably control the commencement of the blowing operation according to the weight and shape of the glass in the mold, the lateral adjustability of the valve permitting varying the commencement of the blowing in each mold independently of the other molds.

5. Blowing mechanism for glassware forming machines comprising a movable mold carriage, forming molds thereon, means for admitting air under pressure to the respective molds for blowing the glass therein to predetermined form, unitary valve means for controlling the admission of pressure to said air admitting means, means for adjusting said valve means to adjustably control the approximate commencement, the volume and pressure of the blowing operation for all of said molds according to the weight and shape of the parisons therein, and means for varying the actual commencement of blowing to suit the particular characteristics of each mold independently of the others.

6. Blowing mechanism for glassware forming machines comprising a movable mold carriage, forming molds thereon, means for admitting air under pressure to the respective molds for blowing the glass therein to predetermined form, valve means for controlling the admission of pressure to said air admitting means, and unitary means for adjustably controlling the approximate commencement of the blowing operation and for varying the volume and pressure from gradual progressive increases of air volume and pressure to a quick application of air at full volume and pressure.

7. Blowing mechanism for glassware forming machines comprising a movable mold carriage, forming molds thereon, means for admitting air under pressure to the respective molds for blowing the glass therein to predetermined form, adjustable valves for controlling and operating said air admitting means, and adjustable means for actuating said valves to supply air in progressively slowly increasing volume and pressure to said air admitting means.

8. Blowing mechanism for glassware forming machines comprising a movable mold carriage, forming molds thereon, means for admitting air under pressure to the respective molds for blowing the glass therein to predetermined form, valve means for controlling the admission of pressure to said air admitting means, and means for controlling and operating said valve means, said control means including an actuator adjustable to vary the rate and degree of opening of said valve means and hence vary the application of air optionally in progressively increasing volume and pressure or quickly at full volume and pressure to suit the condition of the parisons in said molds.

9. In a glassware forming machine having a series of forming molds, and means for admitting blowing air thereto to shape the articles in the molds, means for moving said air-admitting means into cooperative blowing engagement with said molds; comprising means to adjustably control the application of blowing air to said air admitting means as to the commencement of blowing in the respective molds and for variably controlling the volume and pressure for all molds according to the size, weight and shape of the parisons therein.

10. In a glassware forming machine having a series of forming molds, and means for admitting blowing air thereto to shape the articles in the molds, means for moving said air-admitting means into cooperative blowing engagement with said molds; comprising means to adjustably control the application of blowing air to said air admitting means as to the approximate commencement and the volume and pressure for all molds according to the size, weight and shape of the parisons therein, and means for varying the actual commencement of blowing air to each of said air admitting means independently to suit the particular characteristics of each of the parisons therein.

11. Blowing mechanism for glassware forming machines comprising a movable mold carriage, forming molds thereon, means for admitting air under pressure to the respective molds for blowing the glass therein to predetermined form, valve means for controlling the admission of pressure to said air admitting means, and cam means adapted to engage said valve means and move the latter to open position, said cam means being adjustable radially of mold travel to vary the volume and pressure of the blowing air.

12. Blowing mechanism for glassware forming machines as set forth in claim 3 wherein each of the individual valve members is independently adjustable with reference to the radial axis of its mold whereby the commencement of the blowing operation may be varied independently of the other molds and to suit the particular characteristics of the glass in the mold.

13. Blowing mechanism for glassware forming machines as set forth in claim 3 characterized by the valve actuating means being in the form of a cam adjustable circumferentially in the path of travel of said valve members whereby the commencement of the blowing operation may be varied in accordance with the kind of ware being made.

14. Blowing mechanism for glassware forming machines as set forth in claim 3 characterized by the valve actuating member being in the form of an adjustable cam capable of adjustment to partially open the valve members upon initial engagement therewith whereby to admit air in relatively small volume and pressure to the air admitting means and thereafter to progressively increase the volume and pressure of the air to full blowing pressure.

15. Blowing mechanism for glassware forming machines as set forth in claim 3 characterized by valves each having a tapered passage whereby the initial opening movement admits a relatively small volume of air to the air admitting means to slowly start the blowing operation.

16. Blowing mechanism for glassware forming machines as set forth in claim 3 characterized by the valve members being adjustably clamped with reference to said molds.

17. Blowing mechanism for glassware forming machines as set forth in claim 3 characterized by the valve actuating means being laterally adjustable to vary the commencement of the blowing as well as radially adjustable to vary the volume and pressure of the blowing air in accordance with the type of ware being made.

18. Control mechanism for glassware forming machines having a series of movably mounted molds and individual air admitting blowheads movable therewith, comprising valve means for controlling the admission of air to said blowheads and rotatable therewith, and means lying in the path of said valve means adapted to actuate said valve means to admit air to said blowheads, said means being adjustable to vary the commencement and duration of the blowing operation and also being adjustable to vary the degree of opening of said valve means to vary the volume and pressure of the air admitted to said molds.

19. Control mechanism for glassware forming machines comprising a movable mold carriage, forming molds thereon, and means for admitting air under pressure to the respective molds for blowing the glass therein to predetermined form, said control mechanism including valve means for controlling the admission of pressure to said air admitting means, and cam means adapted to engage said valve means and move the latter to operative position, said cam means being adjustable to regulate the degree of opening of said valve means and to vary the volume and pressure of the blowing air from slight volume and pressure progressively to full volume and pressure.

20. Control mechanism for glassware forming machines comprising a movable mold carriage, forming molds thereon, and means for admitting air under pressure to the respective molds for blowing the glass therein to predetermined form, means for moving said air-admitting means into cooperative blowing relation to said molds, said control mechanism including valve means for controlling the admission of pressure to said air admitting means, and cam means adapted to engage said valve means and move the latter to operative position, said cam means being adjustable radially of mold travel to vary the volume and pressure of the blowing air independently of the movement of the mold carrier according to the nature of the ware being made, and means for varying the commencement of the blowing operation for each mold independently of the others.

21. Blowing mechanism for machines for making hollow glass containers, comprising a movable mold carriage, forming molds thereon, means for admitting air under pressure to said mold for blowing the glass therein to predetermined form, means for moving said air-admitting means into cooperative blowing relation to said molds valve means for controlling the admission of pressure to said air admitting means, and cam means adapted to engage said valves and move them to open position, said cam means being adjustable to vary the volume and pressure of the blowing air from slight volume and pressure progressively to full volume and pressure, and means for varying the commencement of the blowing operation for each mold independently of the others.

22. In a glassware forming machine having a series of forming molds, and means for admitting blowing air thereto to shape the articles in the mold, comprising means to adjustably control the application of blowing air to each air admitting means as to the commencement, volume and pressure for each mold independently of the others.

23. Blowing mechanism for glassware forming machines as set forth in claim 3 characterized by means individual to each of said air admitting means for variably controlling the volume and pressure to each mold independently of the others.

24. Blowing mechanism for glassware forming machines having a rotatable mold carriage with a series of forming molds thereon, comprising means individual to each of said molds and traveling therewith for admitting air under pressure to the respective molds for blowing the glass therein to predetermined form means for moving said air admitting means into cooperative blowing engagement with said molds, valve means movable with said molds for controlling the admission of blowing pressure to said molds from said air-admitting means, means adjustably positioned in the path of said valve means for actuating said valve means to adjustably control the approximate commencement of blowing for all of said molds as said molds reach a predetermined position in their path of travel, and means for individually varying the actual commencement of blowing in each mold independently of the others optionally in advance of or subsequent to said predetermined position of approximate commencement of blowing.

25. Blowing mechanism for glassware forming machines having a rotatable mold carriage with a series of forming molds thereon, comprising means individual to each of said molds and traveling therewith for admitting air under pressure to the respective molds for blowing the glass therein to predetermined form, means for moving said air admitting means into cooperative blowing engagement with said molds, valve means movable with said molds for controlling the admission of blowing pressure to said molds from said air-admitting means, means adjustably positioned in the path of said valve means for actuating said valve means to adjustably control the approximate commencement of blowing for all of said molds as said molds reach a predetermined position in their path of travel, and means for variably adjusting the position of the valve means with respect to said molds whereby the actual commencement of blowing may be varied optionally in advance of or subsequent to said predetermined position of approximate blowing.

EDWARD G. BRIDGES.